(12) United States Patent
Wang

(10) Patent No.: US 12,194,933 B2
(45) Date of Patent: Jan. 14, 2025

(54) POWER SUPPLY CONTROL SYSTEM AND VEHICLE

(71) Applicant: BEIJING BAIDU NETCOM SCIENCE TECHNOLOGY CO., LTD., Beijing (CN)

(72) Inventor: Ganghui Wang, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/058,361

(22) Filed: Nov. 23, 2022

(65) Prior Publication Data
US 2023/0091052 A1 Mar. 23, 2023

(30) Foreign Application Priority Data

Nov. 24, 2021 (CN) .......................... 202111402508.6
Nov. 24, 2021 (CN) .......................... 202122905582.0

(51) Int. Cl.
*B60R 16/03* (2006.01)
*B60R 16/023* (2006.01)
*H02H 7/12* (2006.01)

(52) U.S. Cl.
CPC .......... *B60R 16/03* (2013.01); *B60R 16/0231* (2013.01); *H02H 7/12* (2013.01)

(58) Field of Classification Search
CPC ........ B60R 16/03; B60R 16/0231; H02H 7/12
USPC .................................................. 307/9.1, 10.1
See application file for complete search history.

(56) References Cited

U.S. PATENT DOCUMENTS

| 8,392,050 B2 * | 3/2013 | Arai ...................... B60R 16/033 |
| | | 340/636.15 |
| 8,798,832 B2 * | 8/2014 | Kawahara ............... B60L 58/26 |
| | | 701/32.7 |
| 9,377,831 B2 * | 6/2016 | Nakamura .......... B60R 16/0232 |

(Continued)

FOREIGN PATENT DOCUMENTS

| CN | 106773984 A | 5/2017 |
| CN | 211405485 U | 9/2020 |
| EP | 2648943 B1 | 1/2018 |

(Continued)

OTHER PUBLICATIONS

Office Action issued for Japanese patent application 2022-187589, mailed Nov. 7, 2023 (31 pages).

(Continued)

*Primary Examiner* — Hal Kaplan
(74) *Attorney, Agent, or Firm* — Osha Bergman Watanabe & Burton LLP

(57) ABSTRACT

A power supply control system and a vehicle includes: a plurality of supplying branches; a voltage conversion module, connected between an output end of a low-voltage direct current (DC) power supply and an input end of each of the supplying branches, configured to convert a voltage of output DC of the low-voltage DC power supply to a preset voltage; an information acquisition module, configured to collect temperature information of a preset area and/or load information; and a control module, communicating with the information acquisition module, configured to generate control signals for the supplying branches based on the temperature information of the preset area and/or load information.

18 Claims, 2 Drawing Sheets

(56) References Cited

U.S. PATENT DOCUMENTS

2005/0078024 A1  4/2005  Harrington
2012/0046794 A1  2/2012  Altimore et al.

FOREIGN PATENT DOCUMENTS

| JP | 2005295791 A | 10/2005 |
|---|---|---|
| JP | 2009011040 A | 1/2009 |
| JP | 2010076595 A | 4/2010 |
| JP | 2012125072 A | 6/2012 |
| WO | 2010109956 A1 | 9/2010 |

OTHER PUBLICATIONS

Extended European Search Report issued in European Application No. 22209129.0, mailed on Nov. 4, 2023 (11 pages).

\* cited by examiner

POWER SUPPLY CONTROL SYSTEM AND VEHICLE

CROSS REFERENCE TO RELATED APPLICATION

This application is based on and claims priorities to Chinese patent application No. 202111402508.0 and 202122905582.6, filed on Nov. 24, 2021, the entire contents of which are hereby introduced into this application as a reference.

TECHNICAL FIELD

The disclosure relates to the field of a vehicle technology, in particular to a power supply control system and a vehicle.

BACKGROUND

An on-board power supply system in the related art realizes output control for a power supply through simple electrical components such as a relay, a conducting strip and a fuse, and a voltage platform may only realize electric signal output with a single level, but cannot satisfy power demands of various devices on a vehicle.

UTILITY MODEL CONTENT

The disclosure provides a power supply control system and a vehicle.

According to a first aspect of the disclosure, a power supply control system is provided. The system includes:
a plurality of supplying branches;
a voltage conversion module, connected between an output end of a low-voltage direct current (DC) power supply and an input end of each of the supplying branches, configured to convert a DC voltage output by the low-voltage DC power supply to at least one preset voltage;
an information acquisition module, configured to acquire temperature information of a preset area and/or load information; and
a control module, communicating with the information acquisition module, configured to generate control signals for the supplying branches based on the temperature information of the preset area and/or the load information.

According to a second aspect of the disclosure, a vehicle is provided. The vehicle includes:
a low-voltage DC power supply; and
a power supply control system, electrically connected to an output end of the low-voltage DC power supply;
in which the power supply control system comprises:
a plurality of supplying branches;
a voltage conversion module, connected between an output end of a low-voltage direct current (DC) power supply and an input end of each of the supplying branches, configured to convert a DC voltage output by the low-voltage DC power supply to at least one preset voltage;
an information acquisition module, configured to acquire temperature information of a preset area and/or load information; and
a control module, communicating with the information acquisition module, configured to generate control signals for the supplying branches based on the temperature information of the preset area and/or the load information.

It should be understood that the content described in this section is not intended to identify key or important features of the embodiments of the disclosure, nor is it intended to limit the scope of the disclosure. Additional features of the disclosure will be easily understood based on the following description.

BRIEF DESCRIPTION OF THE DRAWINGS

The above and additional features, advantages and aspects of the embodiments of the disclosure will become more apparent in combination with the accompanying drawings and with reference to the following detailed description. In the drawings, same or similar reference numbers refer to the same or similar elements, in which.

Figure 1:
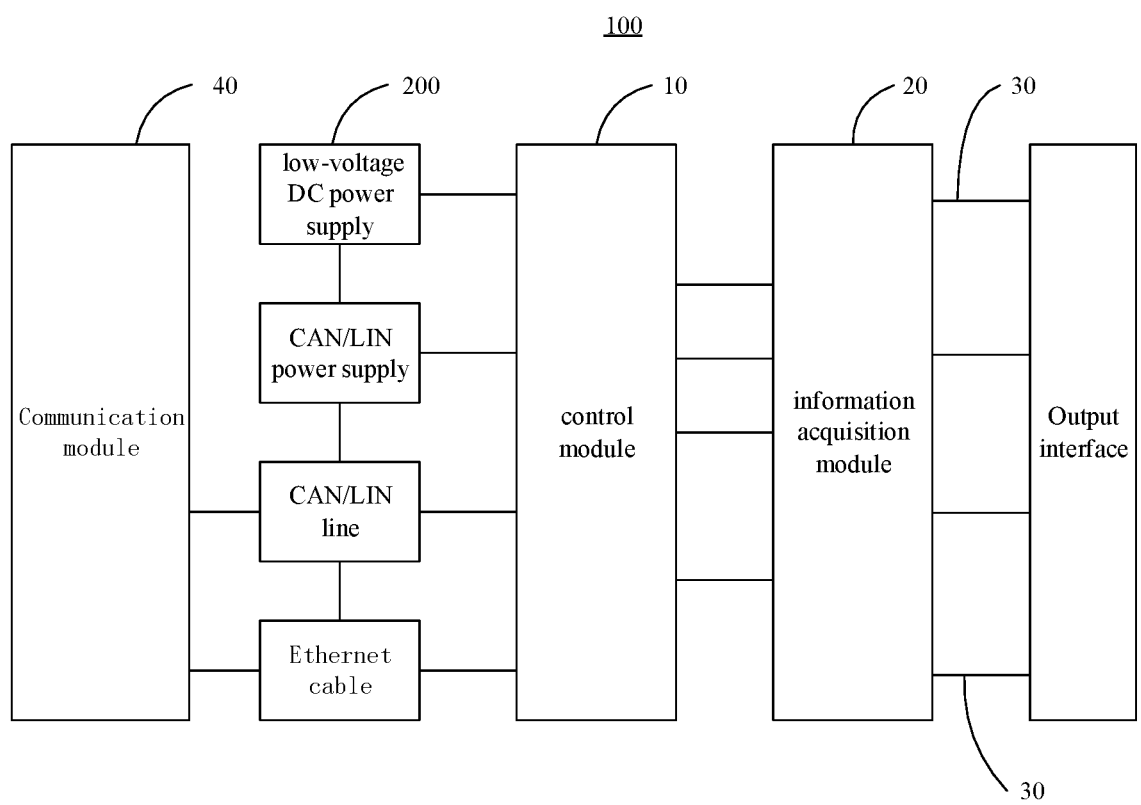
FIG. 1 is a schematic diagram of a power supply control system according to an embodiment of the present disclosure.

DESCRIPTION OF REFERENCE NUMBERS power supply control system 100;
control module 10; information acquisition module 20; supplying branch 30; communication module 40;
low-voltage DC power supply 200.

DETAILED DESCRIPTION

The following describes the exemplary embodiments of the disclosure with reference to the accompanying drawings, which includes various details of the embodiments of the disclosure to facilitate understanding, which shall be considered merely exemplary. Therefore, those of ordinary skill in the art should recognize that various changes and modifications can be made to the embodiments described herein without departing from the scope and spirit of the disclosure. For clarity and conciseness, descriptions of well-known functions and structures are omitted in the following description.

The power supply control system 100 according to an embodiment of the disclosure is described below with reference to FIG. 1.

As illustrated in FIG. 1, the power supply control system 100 includes a plurality of supplying branches 30, a voltage conversion module, an information acquisition module 20, and a control module 10.

Figure 2:
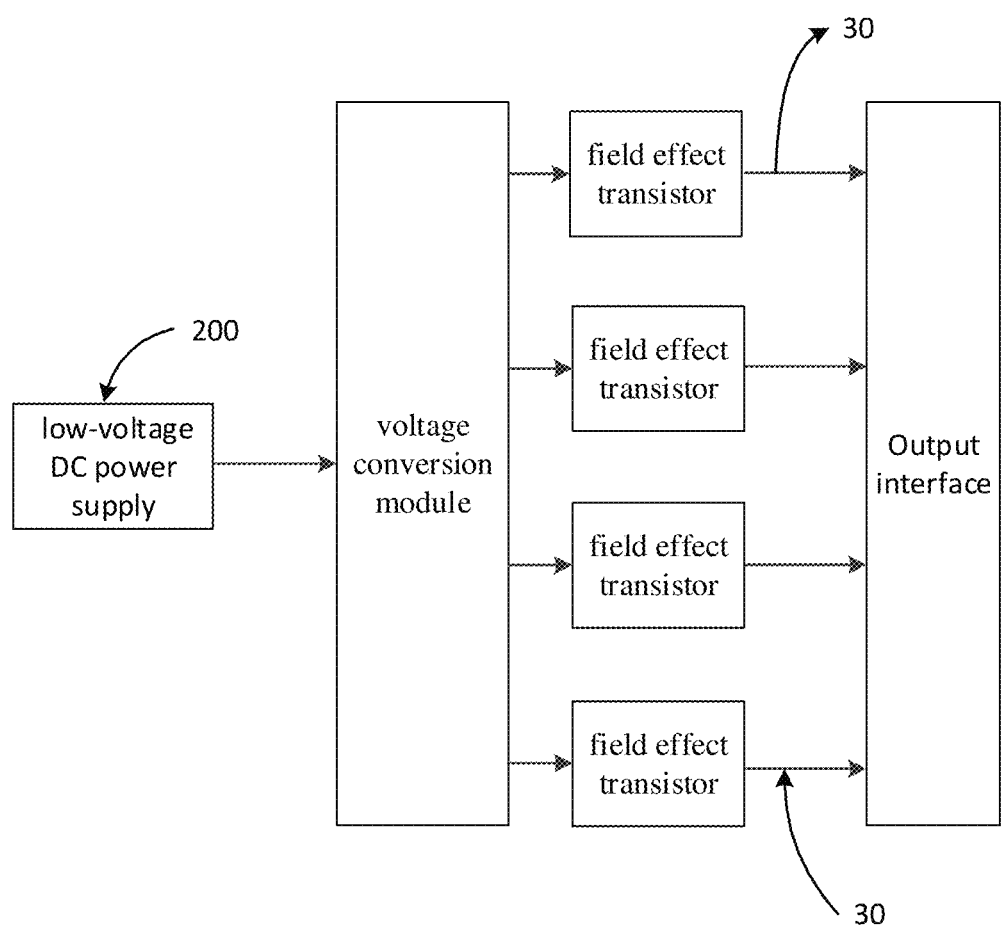
FIG. 2 is a schematic diagram of a power supply control system according to another embodiment of the present disclosure.

As illustrated in FIG. 2, the voltage conversion module is connected between an output end of the low-voltage DC power supply 200 and an input end of each of the supplying branches 30. The voltage conversion module is configured to convert a DC voltage output by the low-voltage DC power supply 200 to at least one preset voltage. The information acquisition module 20 is configured to acquire temperature information of a preset area and/or load information. The control module 10 communicates with the information acquisition module 20, and is configured to generate control signals for the supplying branches 30 based on the temperature information of the preset area and/or the load information.

The power supply control system 100 of an embodiment of the disclosure may be applied for a vehicle, especially an autonomic vehicle. The power supply control system 100 may be integrated into an electrical box. The electrical box is suitable for being installed on the vehicle and electrically connected to the low-voltage DC power supply 200 of the vehicle. The electrical box is provided with a plurality of output interfaces electrically connected to the plurality of supplying branches 30, which is configured to electrically connect with electrical devices on the vehicle to supply power to the electrical devices.

Illustratively, the voltage conversion module may be a DC transformer, such as, a DC-DC converter. The preset voltage may be set at will according to an actual situation. For example, the preset voltage may be 3V, 5V, 24V or 36V. In addition, the voltage conversion module may convert the voltage of the low-voltage DC power supply 200 into a plurality of types of voltages, and transmit the voltages output by the voltage conversion module to respective supplying branches 30, to realize electric signal output with multi voltage levels. An output end of each of the supplying branches 30 is connected to the output interface of the electrical box.

For example, the control module 10 may adopt a Microcontroller Unit (MCU). The MCU, also known as single chip microcomputer or single chip machine, is a chip-level computer formed by reducing frequency and specification of a Central Process Unit (CPU), and integrating peripheral interfaces such as a memory and a timer, and even a Liquid Crystal Display (LCD) driver circuit on a single chip, and performs different combination controls for different application scenarios.

The information acquisition module 20 may include a variety of types of sensors, for example, temperature sensors, voltage sensors and current sensors, to acquire temperature information of the preset area, voltage information and current information.

The preset area may be set according to an actual situation. For example, the preset area may be an area with high power, such as a chip area for the control module 10, or an area corresponding to a supplying branch 30 with a relatively large output current.

The control module 10 generates the control signals based on the temperature information of the preset area and/or the load information sent by the information acquisition module 20, to control connection or disconnection of the supplying branches 30. The control signals may include connection control signals and disconnection control signals. A connection control signal is configured to connect the corresponding supplying branch 30, and a disconnection control signal is configured to disconnect the corresponding power-supply branch 30.

For example, when a temperature of an area corresponding to the preset area, e.g., a certain supplying branch 30, exceeds a preset temperature threshold value, the control module 10 generates and sends the disconnection control signal to disconnect the supplying branch 30 corresponding to the area.

According to the power supply control system 100 of an embodiment of the disclosure, with providing the plurality of supplying branches 30 and the voltage conversion module, the voltage of the low-voltage DC output by the low-voltage DC power supply 200 is converted to the at least one preset voltage, and the at least one preset voltage may output through the plurality of supplying branches 30, thus achieving low-voltage DC output with multi voltage levels, which may satisfy electricity demands of different electrical devices. In addition, with providing the information acquisition module 20 and the control module 10, the control module may control the connection or disconnection of the supplying branches based on the temperature information of the preset area and/or the load information acquired by the information acquisition module, therefore monitoring the temperature of the preset area and/or the load may be realized, and the output of the corresponding supplying branch 30 is disenabled once abnormal temperature of the preset area and/or abnormal load is detected, thereby improving safety and stability of power supplying for the power supply control system 100.

In an implementation, there are a plurality of types of preset voltages, and each of the preset voltages corresponds to at least one supplying branches 30.

It should be noted that, in an embodiments of the disclosure, "a plurality of" refers to two or more, that is, there are at least two types of preset voltage.

For example, the low-voltage conversion module may adopt a DC-DC converter. The DC-DC converter may convert a voltage of input low-voltage DC into various types of preset voltages, and send each preset voltage to the corresponding supplying branch 30.

It may be understood that, the low-voltage DC power supply on the vehicle generally outputs 12V low-voltage DC. The voltage conversion module between the output end of the low-voltage DC power supply 200 and the supplying branches 30, may convert the voltage of the low-voltage DC from 12V to various types of preset voltage, to satisfy electricity demands of different electrical devices on the vehicle.

For example, the voltage conversion module may convert the voltage of the low-voltage DC into one or more preset voltages, and send each preset voltage to the corresponding supplying branch 30. For example, the system may have six supplying branches 30, and the voltage conversion module may convert the voltage of the low voltage DC into 3V, 5V, 24V and 36V, respectively, an DC voltage output through a first supplying branch 30 is 3V, DC voltages output through a second supplying branch 30 and a third supplying branch 30 are 5V, DC voltages output through a fourth supplying branch 30 and a fifth supplying branch 30 are 24V and a DC voltage output through a sixth supplying branch 30 is 36V.

Based on the above implementation, the voltage of the low-voltage DC output by the low-voltage DC power supply 200 is converted into various types of preset voltages and output each preset voltage through the corresponding supplying branch 30, realizing multi-level voltage output of the power supply control system 100, which may satisfy electricity demands of different electrical devices on the vehicle with different input voltage specifications.

In an implementation, as illustrated in FIG. 2, each supplying branch 30 is provided with a field effect transistor (FET) such as a Metal-Oxide-Semiconductor field effect transistor (MOSFET), and the control signals are configured to control on or off of the field effect transistor. For example, the MOSFET, i.e., MOS transistor, may be an N-type Metal-Oxide-Semiconductor (NMOS) transistor or a P-type Metal-Oxide-Semiconductor (PMOS) transistor.

It is understood that the MOS transistor is regarded as a switching component which may operate in two states, i.e., an on state and an off state. Since the MOS transistor is a voltage controlled element, an operating state of the MOS transistor is mainly determined by a gate-source voltage uGS. When the gate-source voltage uGS is less than a threshold voltage UT, the MOS transistor operates in a cutoff region, a drain-source current iDS is basically 0, an output voltage of the MOS transistor uDS≈UDD, and the MOS transistor is in an "off" state, at this time the corresponding supplying branch 30 is in a disconnection state. When the gate-source voltage uGS is greater than or equal to the threshold voltage UT, the MOS transistor operates in a conduction region, the drain-source current iDS is equal to UDD/(RD+rDS), namely iDS=UDD/(RD+rDS), rDS is a drain-source resistance when the MOS transistor is on, the MOS transistor is in an "on" state, at this time the corresponding supplying branch 30 is in a connection state.

According to the above characteristics of the MOS transistor, the control signal may be an electrical signal. In detail, the control signal includes a connection control signal or a disconnection control signal. The connection control signal is configured to transmit an electrical signal with a voltage greater than the voltage UT of the MOS transistor to a gate of the MOS transistor, and the disconnection control signal is configured to transmit an electrical signal with a voltage less than the voltage UT of the MOS transistor to the gate of the MOS transistor.

Further, a current carrying capacity of the MOSFET on each of the supplying branches 30 may be set according to current demands of the low-voltage DC actually output by the supplying branches 30, to satisfy the corresponding electricity demands of the electrical devices. It is understood that, by limiting the current carrying capacity of the MOSFET correspondingly, the output of the supplying branches 30 may be from small current at milliampere (mA) level to large current at hundred ampere (100 amp) level, to satisfy the current demands of the electrical devices.

In the above implementation, the control module 10 may send the control signals to the MOSFETs on the supplying branches 30, to control the connection and disconnection of respective supplying branches. Compared with a power supply control system 100 in the related art using a relay to realize connection and disconnection of supplying branches, the solution of the disclosure may effectively reduce thermal effect when the supplying branches 30 is connected due to small on-resistance of the MOSFET.

In an implementation, the load information may include voltage information, and the information acquisition module 20 includes a plurality of voltage sensors provided on the supplying branches 30, each voltage sensor is configured to acquire voltage information of the corresponding supplying branch 30.

For example, the control module 10 compares the voltage information with a preset voltage threshold value range based on the acquired voltage information of each of the supplying branches 30. In response to the voltage information not meeting the preset voltage threshold value range, the control module 10 sends the disconnection control signal to the corresponding supplying branch 30, to disconnect the output of the supplying branch. The voltage threshold value range may be set according to an actual situation.

According to the above implementation, the disclosure may realize monitoring the voltage of each of the supplying branches 30, and determine whether the supplying branch 30 has occurred abnormal faults such as overvoltage, undervoltage and overload according to the acquired voltage information. The output of the supplying branch 30 may be automatically disconnected when the voltage information is abnormal, which may improve safety performance of the power supply control system 100.

In an implementation, the load information may include current information, and the information acquisition module 20 includes a plurality of current sensors provided on the supplying branches 30, each current sensor is configured to acquire current information of the corresponding supplying branch 30.

For example, the control module 10 compares the current information with a preset current threshold value range based on the acquired current information of each of the supplying branches 30. When the current information does not meet the preset current threshold value range, the control module 10 may send the disconnection control signal to the supplying branch 30 to disconnect the output of the supplying branch. The current threshold value range may be set according to an actual situation.

In the above implementation, to the disclosure may realize monitoring the current of each of the supplying branches 30, and determine whether the output current of the supplying branch 30 is abnormal according to the acquired current information. The output of the supplying branch 30 may be automatically disconnected when the current information is abnormal, thereby improving the safety performance of the power supply control system 100.

In an implementation, the information acquisition module 20 may further include a temperature sensor. The temperature sensor is arranged in the preset area to acquire temperature information of the preset area, and the control module 10 controls the connection and disconnection of the supplying branch 30 according to the acquired temperature information.

The preset area may be a certain supplying branch 30 with a larger output current. There may be a plurality of preset areas, and a plurality of temperature sensors are arranged corresponding to the preset areas.

In the implementation, to the disclosure may realize monitoring the temperature of the supplying branch 30 with a larger output current in real time, and when the temperature information does not meet a preset temperature threshold value range, the disconnection control signal is sent to the supplying branch 30, to disconnect the output of the supplying branch 30 in real time.

In an embodiment, the power supply control system 100 may further include an electric quantity sensor provided on the low-voltage DC power supply 200 and configured to acquire state of charge (SOC) information of the low-voltage DC power supply 200. The control module 10 is further configured to generate a power supply state signal according to the SOC information, and the power supply state signal is configured to represent a power supply state of the low-voltage DC power supply 200.

For example, the control module 10 may, based on the SOC information, generate an alarm signal in response to the SOC information being less than a SOC threshold value, and send the alarm signal to a vehicle controller via a communication module 40 for real-time alarm.

In the above implementation, the power supply control system 100 of an embodiment of the disclosure may monitor the electric quantity of the low-voltage DC power supply 200, and timely alarm when the SOC of the power supply control system 100 does not meet the SOC threshold value.

In an embodiment, the power supply control system 100 may further include a communication module 40 communicatively connected with the control module 10. The communication module 40 is configured to communicatively connect with a vehicle controller.

For example, the communication module 40 may include a communication interface. The communication interface is configured to communicate with other devices of the vehicle, for example, communicate with the vehicle controller of the vehicle. The control module 10 is electrically connected with the communication interface, and is configured to send signals to other vehicle devices or receives signals from other vehicle devices via the communication module 40.

In the above implementation, the power supply control system 100 has a function of communicating with other devices of the vehicle, to better realize power control for the entire vehicle based on the function of communication.

In an implementation, the control module 10 is further configured to receive a vehicle signal from the vehicle controller via the communication module 40, and generate the control signals based on the vehicle signals.

For example, the vehicle signal may be an abnormal signal sent by other devices of the vehicle, such as a collision signal of the vehicle, and an equipment failure signal. The control system sends the control signals to the supplying branches 30 based on the abnormal signal, to disconnect or connect the supplying branches 30.

Therefore, the output of the supplying branches 30 may be controlled according to operation states of other devices on the vehicle, to better satisfy the electricity remands of the entire vehicle.

In an implementation, the control module 10 is further configured to send the temperature information of the preset area and/or the load information to the vehicle controller via the communication module 40.

For example, the control module 10 may send the temperature information and/or the load information acquired by the information acquisition module 20, and the SOC information of the low-voltage DC power supply 200, to the vehicle controller of the vehicle via the communication module 40. The vehicle controller may determine whether the power supply system of the vehicle operates abnormally based on the received information.

Therefore, with sending information to the external vehicle controller by the control module 10, the disclosure may realize monitoring an operation condition of the power supply control system 100 by the vehicle controller, thereby further improving the safety performance of the power supply control system 100.

In an implementation, the communication module 40 is configured with at least one of a CAN communication protocol, a LIN communication protocol and an Ethernet communication protocol.

For example, the communication module 40 includes a CAN interface, a LIN interface and an Ethernet interface that are electrically connected to the control module 10. The CAN interface is configured to connect a CAN bus of the vehicle. The LIN interface is configured to connect a LIN bus of the vehicle. The Ethernet interface is configured to connect with other devices of the vehicle that support the Ethernet protocol.

Further, the control module 10 is integrated with a CAN/LIN controller for controlling the CAN interface or the LIN interface to receive and send signals. The power supply control system 100 further includes a CAN/LIN power supply module that is electrically connected to the output end of the low-voltage DC power supply 200. The CAN/LIN power supply module is configured to supply power to the CAN/LIN controller.

In this way, the power supply control system 100 may connect a local area network of the vehicle, to realize real-time communication between the power supply control system 100 and other devices of the vehicle with low communication delay.

According to another aspect of the disclosure, a vehicle is provided. The vehicle may include a low-voltage DC power supply 200 and a power supply control system 100 of the above embodiments of the disclosure. The power supply control system 100 is electrically connected to the output end of the low-voltage DC power supply 200.

For example, a voltage of the low-voltage DC output by the low-voltage DC power supply 200 may be 12V, and the power supply control system 100 of the disclosure converts the voltage of the low-voltage DC power supply from 12V to preset voltages of 3V, 5V, 24V and 36V by the voltage conversion module, and output the preset voltages through at least four supplying branches 30.

It should be noted that other configurations of the vehicle in embodiments of the disclosure may adopt various technical solutions known to those of ordinary skilled in the art now and in the future, and will not be described in detail here.

In the specification, it is to be understood that orientations or positional relations indicated by terms such as "central", "longitudinal", "lateral", "length", "width", "thickness", "upper", "lower", "front", "rear", "left", "right", "vertical", "horizontal", "top", "bottom", "inner", "outer", "clockwise", "counterclockwise", "axial", "radial", and "circumferential" are the orientations or positional relations shown in the accompanying drawings, which are only for the convenience of describing the disclosure and simplifying the description, rather than indicating or implying that the devices or components referred to are arranged in a specific orientation or are constructed and operated in a particular orientation, thus the terms should not be understood as a limitation on the disclosure.

In addition, terms such as "first" and "second" are used herein for purposes of description and are not intended to indicate or imply relative importance or significance. Thus, the feature defined with "first" and "second" may comprise one or more this feature. In the description of the disclosure, "a plurality of" means at least two, unless specified otherwise.

In the disclosure, unless specified or limited otherwise, the terms "mounted," "connected," "coupled" and "fixed" are understood broadly, such as fixed, detachable mountings, connections and couplings or integrated, and can be mechanical or electrical mountings, connections and couplings, and also can be direct and via media indirect mountings, connections, and couplings, and further can be inner mountings, connections and couplings of two components or interaction relations between two components, which can be understood by those skilled in the art according to the detail embodiment of the disclosure.

In the disclosure, unless specified or limited otherwise, the first characteristic is "on" or "under" the second characteristic refers to the first characteristic and the second characteristic can be direct or via media indirect mountings, connections, and couplings. And, the first characteristic is "on", "above", "over" the second characteristic may refer to the first characteristic is right over the second characteristic or is diagonal above the second characteristic, or just refer to the horizontal height of the first characteristic is higher than the horizontal height of the second characteristic. The first characteristic is "below" or "under" the second characteristic may refer to the first characteristic is right over the second characteristic or is diagonal under the second characteristic, or just refer to the horizontal height of the first characteristic is lower than the horizontal height of the second characteristic.

Many different embodiments or examples are provided on the disclosure herein to implement different structures of the disclosure. To simplify the disclosure of the disclosure, the components and settings of specific examples are provided

What is claimed is:

1. A power supply control system, comprising:
a plurality of supplying branches;
a voltage conversion module, connected between an output end of a low-voltage direct current (DC) power supply and an input end of each of the supplying branches, configured to convert a DC voltage output by the low-voltage DC power supply to at least one preset voltage;
an information acquisition module, configured to acquire at least one of temperature information of a preset area or load information, wherein the load information comprises voltage information, and the information acquisition module comprises a plurality of voltage sensors provided on the supplying branches, each voltage sensor is configured to acquire voltage information of the corresponding supplying branch; and
a control module, communicating with the information acquisition module, configured to generate control signals for the supplying branches based on the temperature information of the preset area and/or the load information.

2. The system of claim 1, wherein the voltage conversion module is configured to output a plurality of types of preset voltages, and each of the preset voltages corresponds to at least one supplying branch.

3. The system of claim 1, wherein each supplying branch is provided with a field effect transistor (FET), and each control signal is configured to control on or off of the field effect transistor.

4. The system of claim 1, wherein the load information comprises current information, and the information acquisition module comprises a plurality of current sensors provided on the supplying branches, each current sensor is configured to acquire current information of the corresponding supplying branch.

5. The system of claim 1, further comprising:
an electric quantity sensor provided on the low-voltage DC power supply, configured to acquire state of charge (SOC) information of the low-voltage DC power supply, wherein the control module is further configured to generate a power supply state signal based on the SOC information, and the power supply state signal is configured to represent a power supply state of the low-voltage DC power supply.

6. The system of claim 1, further comprising:
a communication module, communicatively connected with the control module, configured to communicatively connect with a vehicle controller.

7. The system of claim 6, wherein the control module is further configured to receive a vehicle signal from the vehicle controller via the communication module, and generate the control signals based on the vehicle signal.

8. The system of claim 6, wherein the control module is further configured to send the temperature information of the preset area and/or the load information to the vehicle controller via the communication module.

9. The system of claim 6, wherein the communication module is configured with at least one of a Controller Area Network CAN communication protocol, a Local Interconnect Network LIN communication protocol and an Ethernet communication protocol.

10. A vehicle, comprising:
a low-voltage direct current (DC) power supply; and
a power supply control system, electrically connected to an output end of the low-voltage DC power supply;
wherein the power supply control system comprises:
a plurality of supplying branches;
a voltage conversion module, connected between an output end of the low-voltage DC power supply and an input end of each of the supplying branches, configured to convert a DC voltage output by the low-voltage DC power supply to at least one preset voltage;
an information acquisition module, configured to acquire at least one of temperature information of a preset area or load information, wherein the load information comprises voltage information, and the information acquisition module comprises a plurality of voltage sensors provided on the supplying branches, each voltage sensor is configured to acquire voltage information of the corresponding supplying branch; and
a control module, communicating with the information acquisition module, configured to generate control signals for the supplying branches based on the temperature information of the preset area and/or the load information.

11. The vehicle of claim 10, wherein the voltage conversion module is configured to output a plurality of types of preset voltages, and each of the preset voltages corresponds to at least one supplying branch.

12. The vehicle of claim 10, wherein each supplying branch is provided with a field effect transistor (FET), and each control signal is configured to control on or off of the field effect transistor.

13. The vehicle of claim 10, wherein the load information comprises current information, and the information acquisition module comprises a plurality of current sensors provided on the supplying branches, each current sensor is configured to acquire current information of the corresponding supplying branch.

14. The vehicle of claim 10, wherein the power supply control system further comprises:
an electric quantity sensor provided on the low-voltage DC power supply, configured to acquire state of charge (SOC) information of the low-voltage DC power supply, wherein the control module is further configured to generate a power supply state signal based on the SOC information, and the power supply state signal is configured to represent a power supply state of the low-voltage DC power supply.

15. The vehicle of claim 10, wherein the power supply control system further comprises:
a communication module, communicatively connected with the control module, configured to communicatively connect with a vehicle controller.

16. The vehicle of claim 15, wherein the control module is further configured to receive a vehicle signal from the vehicle controller via the communication module, and generate the control signals based on the vehicle signal.

17. The vehicle of claim 15, wherein the control module is further configured to send the temperature information of the preset area and/or the load information to the vehicle controller via the communication module.

18. The vehicle of claim 15, wherein the communication module is configured with at least one of a Controller Area Network CAN communication protocol, a Local Interconnect Network LIN communication protocol and an Ethernet communication protocol.

* * * * *